Figure 1:
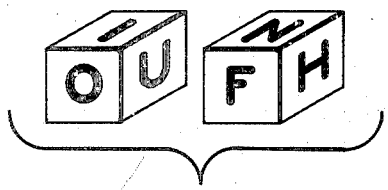

Dec. 20, 1949     L. E. WELCH     2,491,883
EDUCATIONAL GAME BLOCKS
Filed Sept. 11, 1946

INVENTOR
LAWRENCE E. WELCH
BY
ATTORNEY

Patented Dec. 20, 1949

2,491,883

UNITED STATES PATENT OFFICE 2,491,883

EDUCATIONAL GAME BLOCKS

Lawrence E. Welch, East Orange, N. J., assignor to Amerco Products Inc., a corporation of New Jersey Application September 11, 1946, Serial No. 696,185

4 Claims. (Cl. 35—71)

This invention relates to a game apparatus for improving the word recognition and spelling accuracy of children and adults, said apparatus being also adapted to combine with the spelling use, the additional feature of practice in the simple mathematical functions of addition and multiplication.

The game apparatus comprises a plurality of at least two cubes or dice to form a playing set and preferably more for stimulating the adult player's interest in endeavoring to spell words containing a larger number of letters. Each die of a playing set has on each of its six faces some one letter of the English alphabet. In addition to said letter, when the set of dice are to be used for the combined purposes of spelling and exercises in arithmetic, a number, preferably an integer, is permanently affixed adjacent to the alphabetical letter on each face of every cube. The game apparatus can be further modified by affixing to a face of at least one cube in the game set an indicia other than a letter or number, such as a picture of a star, an asterisk (*), a question mark (?), a dot (.), a word, such as "Multiply", etc. The purpose of the indicia marked face being to give the player fortunate enough to so cast the cubes that the indicia face is displayed face uppermost when the cubes come to rest, the opportunity to call or use it for any letter he desires to complete the spelling of a word in combination with any or all letters displayed on the upper faces of the remaining dice in the set. An additional function of the indicia marked face is to give a premium or bonus score to the player using it as a component letter of a word, said score being obtained by multiplying by an agreed factor the sum of the numbers displayed on the cubes used in spelling the word.

A primary object of the invention is to provide a set of dice or cubes having the faces suitably marked in a permanent manner with selected letters of the alphabet so that when the cubes are cast or tumbled out of a dice cup by a player and come to rest, the exposed top faces of the cubes are bound to show on almost every cast a combination of letters, of which at least some, if not all, can be used to fully spell out an authenic word of the English language or any other language, such as French or Spanish, employing the same alphabetical characters and dependent upon vowels and consonants for word formation. To this end it has been found that by suitably marking as by stamping, engraving, embossing, or the like, five of the faces of one of the cubes in a game set with a vowel letter preferably each face having a different vowel letter to thereby use each of the vowel letters A, E, I, O and U, and having the sixth face marked with an indicia or a repetition of one of the previously used vowels or the vowel-consonant letter "Y", and that by marking the faces of the other dice in the set predominantly with consonants, particularly those consonants most frequently appearing in words, that it is possible in practically almost every cast of the game set of cubes to spell out at least a one or two letter word, even with a game set consisting of only two cubes.

With such an arrangement of the vowels and consonants on two or more cubes, the possibility that an authentic word can be spelled is always in the player's favor, a factor of importance when the game is played by children, since they would otherwise readily lose interest or else attempt to spell fictitious words if several casts were required before a combination of letters appeared that could be grouped together to form an authentic word. The game furthermore is adapted for progressive increase in the number of cubes to be used in play to keep pace with the child's expanding vocabulary. Thus, with a child just beginning to learn how to spell, the game can be played with a set of only two or three cubes, at least one of which is a cube having only vowels or vowels and an indicia, whereby the child's attention is necessarily restricted to the simple words with which he is already familiar or can readily comprehend. As his vocabulary increases, additional cubes can be added to the game set thereby enabling him to spell words having a larger number of letters up to a maximum number corresponding to the total cubes or dice in play. In the preferred manner of playing the game, the player is permitted to use the particular letter or indicia exposed on any cube only once in the formation of a word. To further retain the player's interest in the game, the scoring system based upon the sum or product of the numbers appearing on the top faces of those cubes that the player can use in forming an authentic word encourages him to spell the less obvious words rather than those he first associates with the letters displayed, as the value of the numbers adjacent to the different letters can be of a higher order for those letters less frequently used in words than those letters having a higher frequency. Thus, the player may find that in casting a game set of four cubes, he can spell only two words each consisting of three letters from the combination of letters exposed, and accordingly, if alert, he will arrange the cubes in proper order to spell that three-letter word offering the highest point value.

Figures 2, 3:
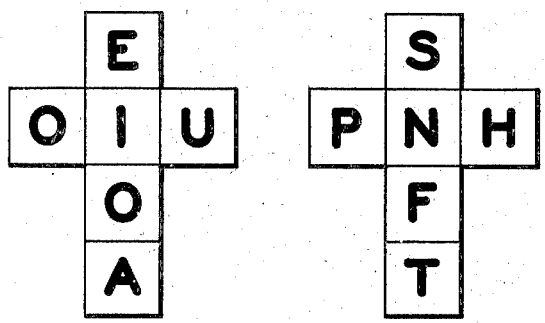
Figure 4:
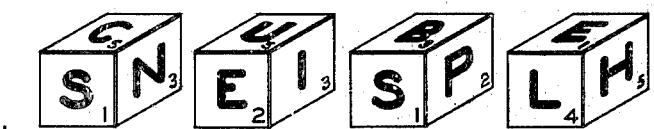
Figures 5, 6, 7, 8:
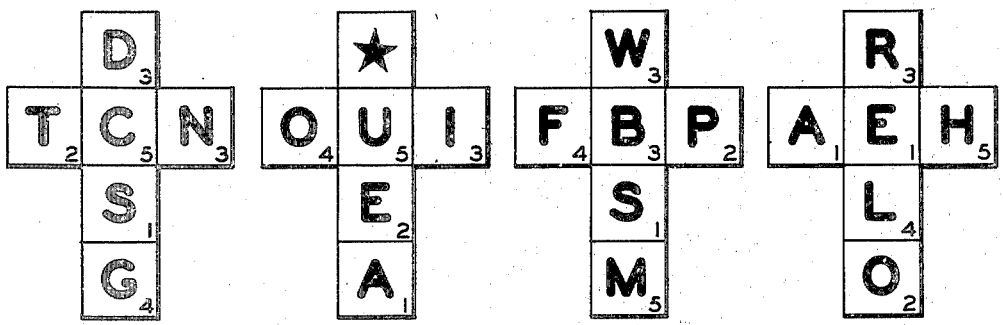

The drawing shows in Fig. 1 a perspective view of a game set of two spelling cubes or dice suggested for children just learning to spell, the face uppermost letters of said cubes forming the word "In";

Fig. 2 a diagrammatic or unfolded view of the cube in Fig. 1 having the letter "I" on its top face;

Fig. 3 a diagrammatic view of the other cube in Fig. 1 having the letter "N" on its top face;

Fig. 4 a perspective view of a game set of four spelling cubes adapted for older children and adults having a considerably larger vocabulary coupled with ability to add and multiply at least simple integers, said cubes having been cast to form the word "Cube";

Fig. 5 a diagrammatic view of the cube in Fig. 4, whose top face exhibits the letter "C";

Fig. 6 a diagrammatic view of the cube in Fig. 4, whose top face exhibits the letter "U";

Fig. 7 a diagrammatic view of the cube in Fig. 4, whose top face exhibits the letter "B"; and Fig. 8 a diagrammatic view of the cube in Fig. 4, whose top face exhibits the letter "E".

Referring to Fig. 1, it will be readily observed that the two cubes, all of whose faces are completely shown in Figs. 2 and 3, have more than an equal possibility on any cast for exposing on their top faces a combination of letters forming an authentic word. Thus, with the vowel cube of Fig. 2 exposing the letter "I", only the consonant "H" on the cube of Fig. 3 yields a non-recognizable English word; if vowel "O" were cast, only the consonant "P" of the cube in Fig. 3 fails to give an authentic English word; should vowel "A" be exposed, then all the consonants of the other die form authentic English words. Only vowels E and U fail to form English words with a majority of the consonants on the cube of Fig. 3. A young child playing with this simple set of two cubes, so lettered, quickly learns what authentic words can be spelled as well as recognizing those combinations of letters that are meaningless or fictitious words.

Referring to Fig. 4, it will be observed that the four letters displayed on the top faces of the game set consisting of four cubes can all be used to form several different words. The maximum use of these letters would be in spelling the four-letter word "Cube" having a total point value of 14 by adding together the integers associated with each letter used in the word "Cube". A player less alert might believe that either the three-letter word "Cub" having a total point value of 13 or else "Cue" having a total point value of 11 are the largest possible words that can be formed from the four letters displayed and therefore would announce either "Cub" or "Cue" as his best scoring word. A young child might only be able to spell "Be" having a point value of 4.

Assuming, however, that the cube of Fig. 6 when cast displayed the star indicia on the top face instead of the letter "U", then the player, if he visualized the word "Cube", would announce that the star indicia was being used for the letter "U", and in this instance, his score is the sum of the numbers appearing on the top faces of the cubes of Figs. 5, 7 and 8, namely, the sum 9, multiplied as in a preferred scoring system by an agreed factor, for instance 2, because the player had used the star indicia in spelling the word "Cube" and is thus entitled to this premium score. Other obvious combinations are to consider the star indicia as the letter "O" for spelling the word "Cob"; as "E" in spelling "Bee"; as "T" in spelling "Bet"; as "D" in spelling "Bed"; as "G" in spelling "Beg"; as "W" in spelling "Web", etc., with corresponding lower scoring values since only two letters in addition to the star indicia were used in spelling these words.

In the game set of four cubes as illustrated in Figs. 4 to 8, it has been found that over 1375 different English words are possible of which about 433 words are formed with the aid of the star indicia. On the other hand, there are only about 10 combinations of letters yielding fictitious or non-authentic words thereby illustrating the advantages of lettering the cubes in accordance with the arrangements herein described.

That the described arrangement for lettering the cubes is also operative for other languages using the same alphabetical characters as the English alphabet is illustrated by a cast of the cubes to form the Spanish word "Dos" using the letter "D" of the cube in Fig. 5, the letter "O" of the cube in Fig. 6 and the letter "S" of Fig. 7; illustrative of a four-letter Spanish word is "Tres" using respectively the cubes of Figs. 5, 8, 6 and 7 cast so as to display the required letters. Similarly the French words "Une" and "Neuf" exemplify three- and four-letter words which can be spelled from a proper cast of the cubes without even resorting to use of the indicia face.

In numbering the cubes, integers are preferred, although fractional numbers can be used for promoting proficiency in their manipulation. Integers of the same value can be affixed on at least one or more faces of each cube as shown in Figs. 5 to 8. Should the cubes be so cast that the top faces of all the cubes show integers of the same value, then the player is entitled to a different premium score which is now computed as in a preferred system of scoring by multiplying the sum of the integers appearing on the letters actually used in forming a word by the common integer or by any other designated factor. Preferably the factor is greater than that for having cast the star indicia since the possibility of casting identical integers on all exposed faces is more remote.

An illustration of such a premium score is for the cubes comprising Figs. 5 to 8 to be cast so as to spell the word "Much"; as all the exposed letters have affixed thereto the integer "5", the player's score would be the sum of all the integers, namely the sum 20, multiplied by the common integer "5" or by any other previously agreed upon factor. Another illustration wherein the player using the same set of cubes is able to spell merely a three-letter word, although all the exposed letters carried the same integer, would be a cast resulting in the letters I—R—W—D, all bearing the common integer 3. By properly rearranging the cubes, the word "Rid" can be spelled, and the premium score would be the sum of the integers of the three letters employed in the word, namely the sum 9, multiplied by the common integer "3" or any other agreed upon factor.

The game apparatus can be used for progressive spelling matches, especially when the set contains three or more cubes. For instance, by using a game set of four cubes a player can begin by casting only two cubes, one of which contains all vowels on its faces and if he succeeds in casting the two cubes whereby he can spell an authentic one or two letter word, he proceeds to cast a third cube, otherwise forfeiting his turn to play the remaining cubes. If the third cube displays a letter that the player is able to combine with either or both of the two letters previously exposed to form an authentic word, he is then entitled to proceed by casting a fourth cube. If such fourth cube results in a recognized word in combination with any or all the exposed letters on the previously cast cubes, then the player has completed a run, entitling him to a grand total of the respective sums as in the preferred system of scoring for all the words formed in seriatim, together with any premium scores as heretofore described.

As all words in the English language as well as the French and Spanish languages contain one or more vowels, the provision that one cube in the game set is devoid of any consonants and contains vowel letters exclusively thereon or in combination only with an indicia marked face which the player can always use as a vowel if he desires, is positive assurance that this minimum essential requirement for word formation is present on every throw or cast of the cubes. It is also recognized that many three and particularly four-letter words contain two vowels. In order that the game apparatus accommodate itself to such normal vowel frequency, but without exceeding this norm whereby more vowel letters will be cast than are generally required at the expense of necessary consonants, vowel letters can be used on other cubes in the set in addition to the cube exclusively lettered with vowels. The additional vowels, however, are so distributed among the remaining cubes that a ratio of one vowel to one consonant is not exceeded on any cast or throw of the cubes. This distribution ratio is exemplified in the drawing for the game set of two cubes and for the game set of four cubes. In the four-cube set, the additional vowels are all located on one cube as shown in Fig. 8, and the remaining cubes other than the vowel cube of Fig. 6 have only consonants on their faces as shown in Figs. 5 and 7.

As the game apparatus is not limited to four cubes, but can be played with as many cubes as is within the average ability of the players to spell or recognize longer words consisting of a total number of letters equal to the number of pieces or cubes in play, additional cubes can be brought into play, maintaining, however, a ratio of not less than one cube containing only consonant letters thereon per cube having only vowel letters thereon or vowels and consonants on its faces. The additional cubes may advantageously have distributed thereon the consonants of less frequent appearance in words, such as j, k, q, v, x and z and also the consonant-vowel y to challenge the spelling ability of the expert player.

What is claimed is:

1. A game apparatus comprising four cubes, each cube having an alphabetical letter on each of its faces, one of said cubes having the vowel letters A, E, I, O, U on five of its faces, the sixth face having an indicia thereon, a second cube having three vowel letters and three consonant letters thereon, and the remaining two cubes having only consonant letters thereon.

2. A game apparatus comprising four cubes, each cube having an alphabetical letter on each of its faces and adjacent to each letter a number, one of said cubes having the vowel letters A, E, I, O, U on five of its faces, the sixth face having an indicia thereon, a second cube having the vowel letters A, E and O and different consonant letters on the rest of its faces, the remaining two cubes having only unlike consonant letters thereon.

3. A game apparatus comprising a plurality of cubes, each cube having an alphabetical letter on each of its faces and adjacent to each letter a number, one of said cubes having only vowel letters on five faces thereof and an indicia on the sixth face, another cube having three different vowel letters and three different consonant letters on its faces, and the remaining cubes having only consonant letters on their faces.

4. A game apparatus comprising a plurality of cubes, each cube having an alphabetical letter on each of its faces and adjacent to each letter an integer of a value substantially inversely proportional to the frequency of the particular letter's occurrence in words, one of said cubes having different vowel letters on five faces thereof and an indicia on the sixth face, another cube having three different vowel letters on three faces thereof and three different consonant letters on the remaining three faces, and the remaining cubes having only consonant letters on their faces.

LAWRENCE E. WELCH.

REFERENCES CITED

The following references are of record in the file of this patent:

UNITED STATES PATENTS

| Number | Name | Date |
|---|---|---|
| 557,307 | Foster | Mar. 31, 1896 |
| 1,286,631 | Hillyard | Dec. 3, 1918 |
| 1,412,204 | Derby | Apr. 11, 1922 |

FOREIGN PATENTS

| Number | Country | Date |
|---|---|---|
| 129,908 | Switzerland | Jan. 12, 1928 |
| 540,876 | Germany | Dec. 30, 1931 |
| 507,695 | Great Britain | June 20, 1939 |